Patented Mar. 30, 1926.

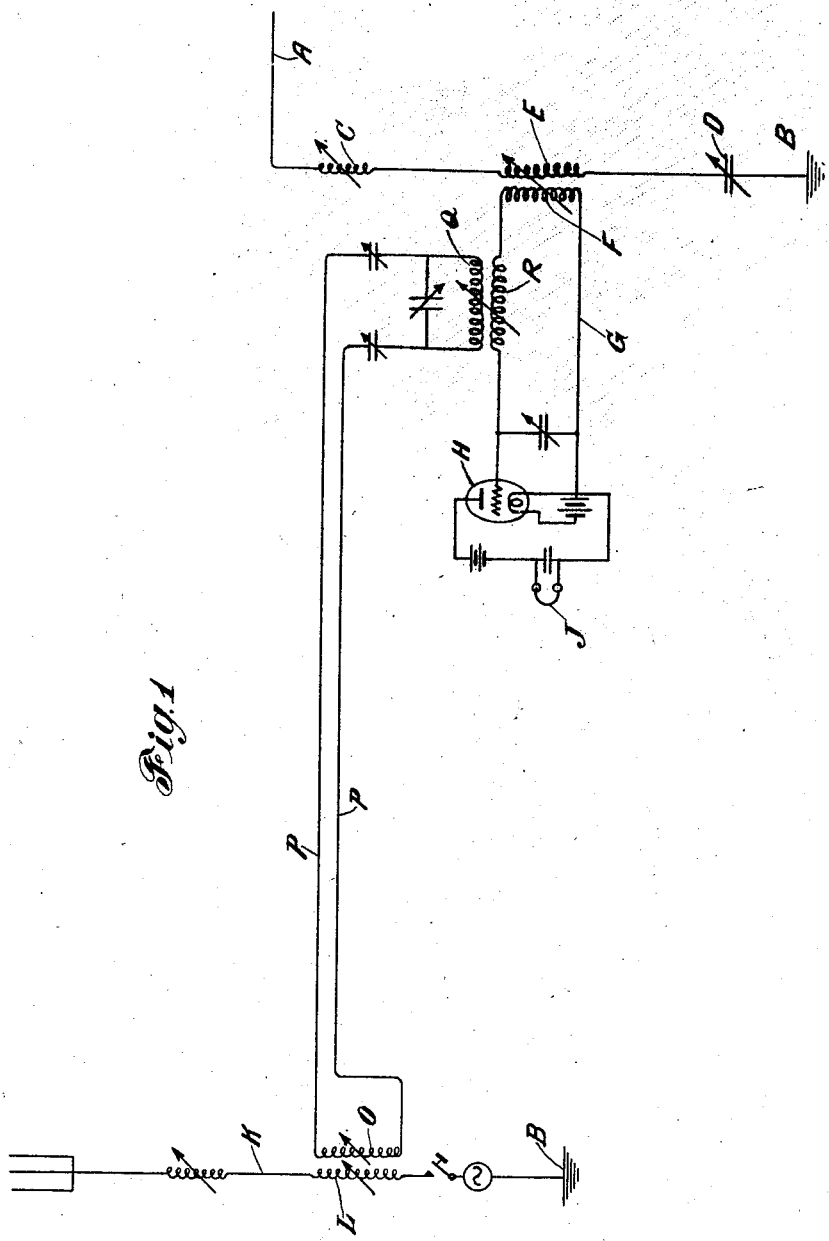

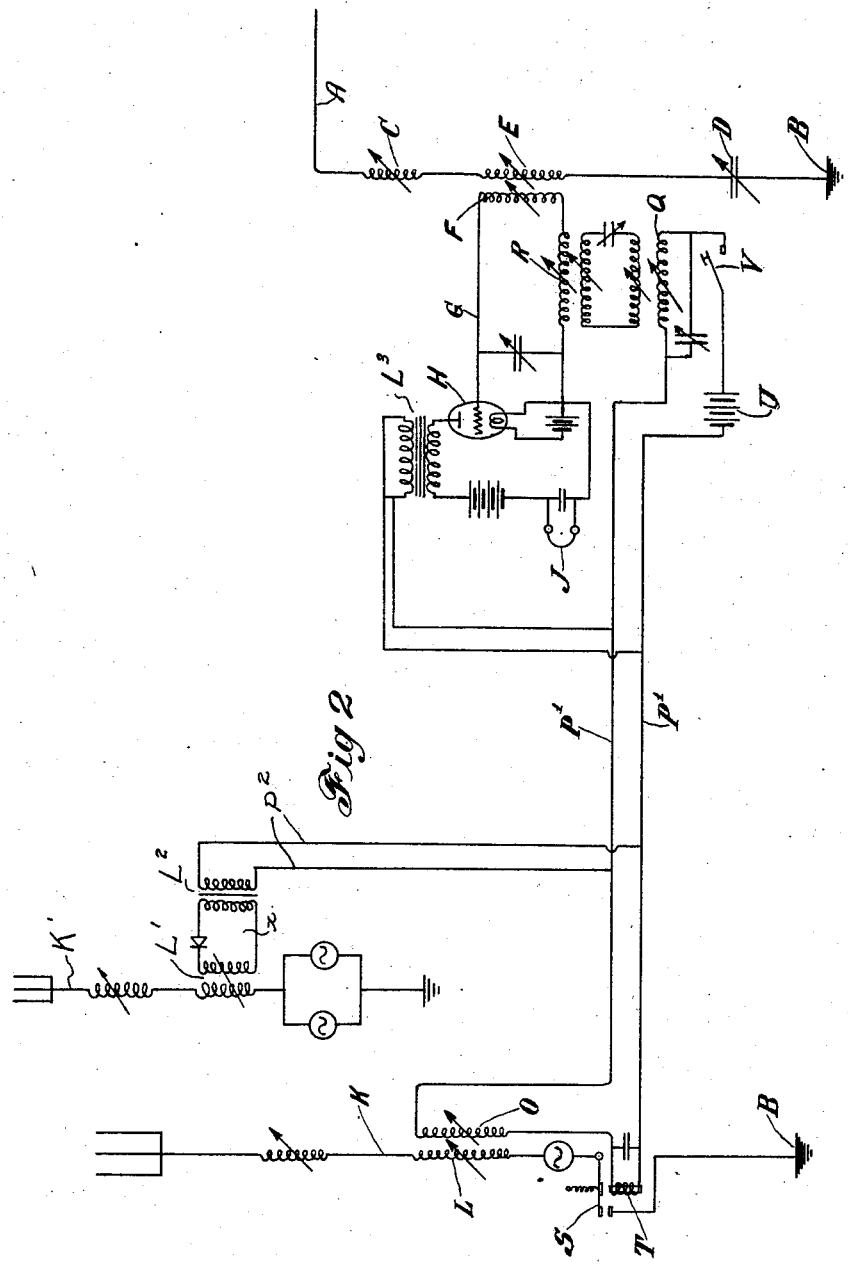

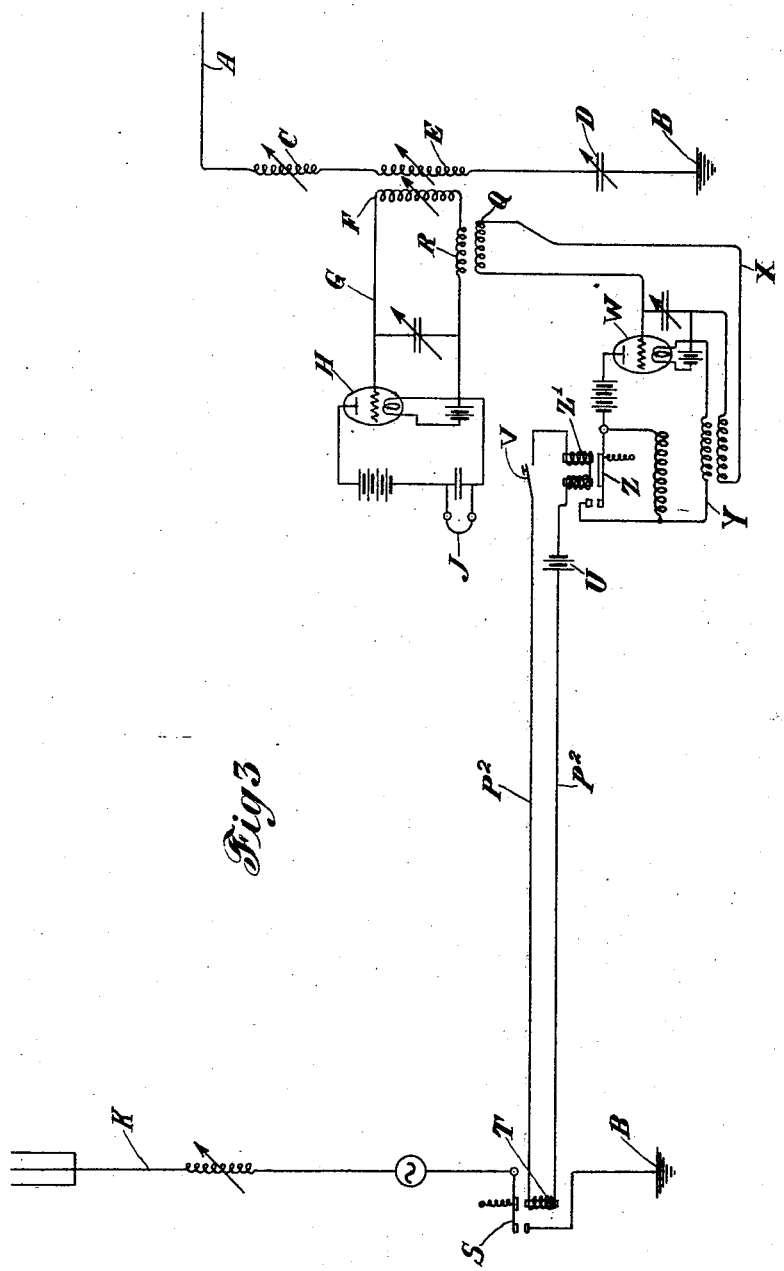

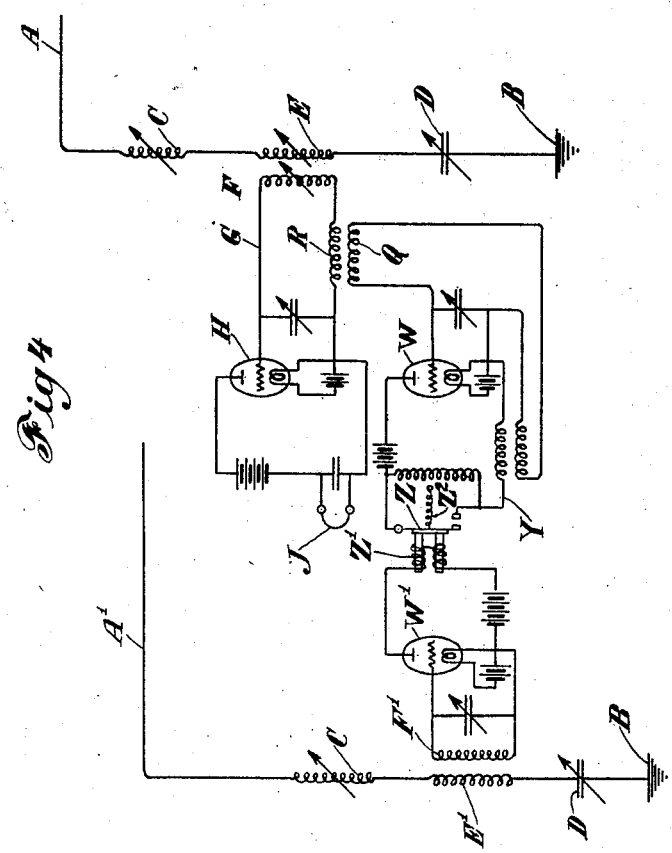

1,578,490

UNITED STATES PATENT OFFICE.

ROY A. WEAGANT, OF NEW YORK, N. Y., ASSIGNOR TO RADIO CORPORATION OF AMERICA, A CORPORATION OF DELAWARE.

APPARATUS FOR PREVENTING INTERFERENCE IN RADIOSIGNALING.

Application filed April 30, 1920. Serial No. 377,764.

*To all whom it may concern:*

Be it known that I, ROY ALEXANDER WEAGANT, a citizen of the United States, and a resident of Douglas Manor, county of Queens, city and State of New York, have invented certain new and useful Improvements in Apparatus for Preventing Interference in Radiosignaling, of which the following is a specification accompanied by drawings.

This invention relates to radio signaling, but more particularly to a method and apparatus for preventing interference between stations.

Next to the interference of static or strays, the most serious difficulty encountered, especially in long distance radio signaling, when a considerable number of stations are worked, is the interference between the stations themselves. When the interfering station is 1000 or more miles away, for instance, from the station at which reception is taking place, the use of different wave lengths has been most effective, but when the interfering station is comparatively near by and of great power, while the signal to be received is from a station at a great distance, the limitations of the capabilities of this method are serious, and the number of stations which can be worked in a given area is comparatively small.

The object of this invention is to secure a method of working and apparatus for overcoming and solving this interference problem and make it possible for any number of stations of any desired power, to work in a given area on any wave length desired.

In accordance with my method, I am enabled to cancel the interference at a receiving station while permitting reception of the desired signals, by opposing substantially equal and opposite neutralizing effects to the interfering effects produced in the receiving circuits of a station due to energy derived through the receiving antenna from interfering waves. These neutralizing effects in the form of oscillations of substantially the same frequency as the interfering effects, set up neutralizing electromotive forces in the receiving circuits substantially equal and opposite to the interfering electromotive forces produced in the receiving circuits due to the receiving antennæ.

In one mode of operation, I provide means for directly affecting the receiving circuits at a receiving station by the signal energy from an interfering transmitting station, and I adjust the receiving circuits until the electromotive force generated therein due to the directly applied energy from the said transmitting station is substantially equal and opposite to that produced by signal energy derived from the antenna at the receiving station due to interfering waves from the said transmitting station, and I thus neutralize the interference, while permitting reception of the desired signals.

In order to directly apply the energy from the interfering station to the receiving circuits at the receiving station, I may employ land wires between the stations, electrically connecting or coupling the transmitting and receiving apparatus, and these land wires may be an ordinary telegraph line or else they may conveniently be the wires used for distant control, in case the interfering station is controlled from the receiving station at which it is desired to receive signals. In either case the normal function of the land line or the distant control wires is not interfered with by utilizing them for the transmission of signal energy for the purposes mentioned.

Another mode of operation in accordance with my invention, is to provide a local source of oscillations at the desired receiving station, capable of generating oscillations of the same frequency as the interfering signals and coupling this oscillator to the receiving circuits, so that the oscillations are directly applied thereto. Means are also provided for controlling the oscillations in accordance with the transmission of signals from the interfering transmitting station, so that neutralizing oscillations start and oppose those picked up in the receiving antenna from the interfering station at the instant of sending. The starting and stopping of the opposing oscillations may be made automatically simultaneous with the signals, so that no effect is produced on the receiving circuits by the local oscillator when the sending key controlling an interfering station is open.

In the drawings I have illustrated several preferred forms of apparatus for carrying out my method in which:

Fig. 1 is a diagrammatic representation of circuits and apparatus showing a land wire circuit coupled to the transmitting apparatus of an interfering station and the receiving circuits of the desired receiving station;

Fig. 2 is a similar view of a modification showing the wires of the distant control circuit similarly coupled to the circuits of the said stations;

Fig. 3 is a similar view of a modification in which a local source of oscillations is provided at the receiving station and automatically controlled by the operation of the transmitting key; and Fig. 4 is a similar view of a modification in which a balancing antenna is shown at the receiving station together with a local source of oscillations automatically controlled by interfering signal energy picked up by said balancing antenna.

Referring to the drawings, and at first more particularly to Fig. 1, A represents the antenna of a receiving station grounded at B and having the usual loading inductance C, variable condenser D and coupling coil E, which latter is coupled through coil F to a suitable receiver or receiving circuit G having, in this instance, the vacuum tube detector H and telephones J with the necessary and desirable circuit connections well understood in the art without further description.

The antenna of an interfering transmitting station is represented diagrammatically at K, which may be a comparatively near-by station, fifty miles distant from station A for instance, or farther away, or else it may be closely adjacent to station A in a case of simultaneous sending and receiving from the same station, because the principles of my invention are applicable to such a case.

As shown, the antenna K at the transmitting station is coupled through coupling coils L and O to the land wires P which, in this instance, may be ordinary telegraph wires or else they may constitute a separate circuit for the purpose of directly applying the transmitted energy to the receiving circuits G. The land circuit P is also coupled as shown through coupling coils Q and R to the receiving circuits G.

In the operation of the system, let it be assumed that station A represents Belmar, New Jersey, which is receiving Carnarvon, Wales at 14000 meters, and that the interfering station K represents New Brunswick, New Jersey, about fifty miles distant from Belmar, also sending at 14000 meters. Energy is received at the receiving station from the transmitting station K by both the aerial A and over the land wires P. The coupling Q, R, of the land wires to the receiving circuits G is then adjusted until the electromotive force generated in the receiving circuits due to the land wires P is substantially equal and opposite to that produced therein by the aerial A, with the result that the interference from station K goes out, without in any way affecting the capabilities of the system for receiving the distant Carnarvon station at the same wave length.

It is a relatively easy matter to send energy over the land wires P from the transmitting station K, which will be very great relative to the static energy picked up, or compared to the signal energy which these wires will pick up from the distant Carnarvon station, so that the coupling between coils Q and R at the receiving station, necessary to transmit sufficient of the signal from station K to balance the interfering signal energy picked up by the aerial A, will transmit none at all of the signal energy from the distant Carnarvon station and substantially no static. This is the all important necessary condition which no other method or arrangement heretofore known to me provides. The usual and customary arrangements employing balancing aerials are only operative when a line drawn between the interfering transmitting station and the receiving station forms a suitable right angle, with the line to the station from which it is desired to receive signals and even then no provision has been made for minimizing the interference or static disturbances.

In my method of preventing interference, it makes no difference what the relative locations of the receiving and transmitting stations may be, nor what the wave length. Furthermore, in the arrangements shown herein, obviously static eliminating devices may be used in accordance with the methods devised by me as covered by my co-pending applications (Serial Nos. 181,458, 206,723, 206,883, 275,552, 275,553, 275,554, 275,555, 275,556, 275,557, 373,929, and Patents Nos. 1,336,398, 1,356,751, 1,356,752, 1,389,800 and 1,353,002) and the balancing signal potential introduced into the receiving circuits without disturbance of the conditions for elimination of static. Sufficient energy for the purposes of my invention may be readily fed over the line wires P, even although they cannot be tuned except to harmonics, since so little energy is required to balance that picked up by the antenna A, which should be understood to be a small low aerial as now used instead of high towers as previously used.

Any number of transmitting stations may be connected, by land wires to the receiving station, and the same pair of wires may be extended to each transmitting station and used to transmit opposing or neutralizing effects to the receiving circuits at station A, regardless of the wave length on which the stations are working. Also, if desired, two frequencies may be generated at the transmitting station in a well understood manner and the resulting beat frequency sent over the line, opposing it to the same audio frequency current in the receiver.

It is easily possible for instance, for the small additional cost of a pair of land wires P perhaps 150 miles long, to permit the operation of an additional high power station in a given area, which would obviously well warrant the added cost.

The arrangements referred to in the two preceding paragraphs are illustrated on Fig. 2 of the drawings in which K' is an additional aerial supplied with high frequency current by two generators, the frequencies of which are adapted to produce beats. The aerial is coupled by means of transformer L', the secondary of which is connected to a rectifying circuit X in order to obtain the beat frequency currents. These are impressed on the line $P^2$, $P^2$ which extends to the line P', P' by means of the audio frequency transformer $L^2$. At the receiver an audio frequency transformer $L^3$ is associated with the output circuit for impressing the beat frequency on the receiver G.

Instead of a separate line P as shown in Fig. 1, the usual distant control wires P' may be employed in carrying out my method as shown in Fig. 2, without in any way interfering with their operation for the purpose of controlling a distant station K. In this case, S represents the key at the interfering station K actuated by electromagnet T, in the circuit P', having the energizing battery U and controlling key V at the receiving station A. The control circuit P' is coupled as shown at L, O, and Q, R, to the transmitter and receiver respectively and each time that a signal is sent, opposing oscillations are set up in the receiver G as described. Another arrangement for carrying out the method is shown in Fig. 3 in a case in which the transmitting station K is controlled from the receiving station A by the control circuit $P^2$ as before. A local source of oscillations, as for instance an oscillating vacuum tube W with suitable oscillating circuits, is provided at the receiving station A, capable of generating oscillations of the same frequency as the transmitting station K. As shown in this instance the grid circuit X of the vacuum tube W is coupled into the receiving circuits G through coils Q and R, and the plate circuit Y of tube W is provided with the contact device Z controlled by electromagnet Z' in the control circuit $P^2$. Each time that the key V closes, the contact device Z closes and oscillations from the tube W start and oppose those in the receiving circuits G picked up by the receiving antenna A from station K, and since the starting and stopping of interfering signals and neutralizing oscillations are simultaneous, no effect is produced on the receiving circuits G by the local oscillator when the transmitting key V is open, and cancellation of the interference is secured when the key is closed.

If interference is produced at station A for instance, by some station other than station K, the arrangement shown in Fig. 4 may be used for cancelling the other interference. In this case A' represents a separate balancing receiving antenna tuned to the particular interfering station from which interference is to be prevented. Antenna A' is coupled through coils E' and F' to the grid circuit of a vacuum tube W' having a relay Z' in its plate circuit, controlling the normally open contact device Z, in the plate circuit Y of the local oscillator W, which is coupled as in Fig. 3 into the receiving circuits G of the receiving station A. When the interfering signal is picked up by balancing antenna A', the plate current in the vacuum tube W' is reduced and the attraction of the relay Z' for its armature is weakened, so that the contact device E closes its contacts under the influence of the spring $Z^2$, and in this way the local oscillator W is controlled. The oscillations of the local oscillator in this instance are to be the same as the interfering signal and are adjusted to oppose the said signal in the receiving circuits G.

I have found that the automatic operation of a vacuum tube relay on signals of the intensity of those under consideration, is comparatively easily accomplished and has proved satisfactory. One such device or arrangement as that shown in Fig. 4, may be provided for each interfering station and if these stations differ in wave length by a comparatively small amount, a large number of such interference preventing devices is permissible, since in distinguishing between them, intensities of substantially the same order are dealt with, and not of a vastly different order, such as obtain when an attempt is made to receive from a far distant station and cut out the nearby interfering station by tuning. The arrangement shown in Fig. 4 having a balancing antenna A', retains the same necessary fundamental characteristics of the land wire arrangements shown in the other figures, that is, it provides neutralizing currents of the same frequency, and generated simultaneously, as the interfering signal currents, which neutralizing currents are unaccompanied by static currents, other interfering signal currents, or any of the desired signal currents, and are used to oppose and neutralize those interfering signal currents picked up by the receiving antenna A. The balancing antenna arrangement shown in Fig. 4, while not possessing substantially unlimited scope in the matter of wave lengths afforded by land wire arrangements, is on the other hand perhaps less expensive to install, and for this reason may be preferred in certain instances depending upon actual conditions.

In all of the arrangements shown and described, simple and efficient means are provided for overcoming troublesome effects of interference, but I am not to be understood as limiting the invention to the precise forms of apparatus shown, or particular methods described, which are only illustrative of my new methods and apparatus, and those skilled in the art may devise equivalents within the scope of my claims forming a part of this specification, without departing from the spirit of my invention.

I claim and desire to obtain by Letters Patent the following:

1. In radio signaling the combination of a receiving station and a transmitting station, means for generating two radio frequency currents adapted to give a beat frequency, a circuit extending from one station to the other adapted to couple the stations together and means for opposing beat frequency currents from said circuit to balance similar currents collected by the receiving station due to radiation from the transmitting station.

2. In radio signaling systems the combination of a receiving station and a transmitting station means for generating two radio frequency currents adapted to give a beat frequency and a circuit extending from one station to the other for conveying said beat frequency currents to the receiver, and means for utilizing said beat frequency currents from said circuit to balance similar currents collected by the receiving station due to radiation from the transmitting station.

In testimony whereof I hereunto affix my signature this 27th day of April, 1920.

ROY A. WEAGANT.